UNITED STATES PATENT OFFICE.

THOMAS D. SMITH, OF NEW YORK, N. Y.

PROCESS OF SCOURING WOOL.

1,405,560.  Specification of Letters Patent.  Patented Feb. 7, 1922.

No Drawing.  Application filed May 7, 1921. Serial No. 467,671.

*To all whom it may concern:*

Be it known that I, THOMAS D. SMITH, a citizen of the United States, residing at New York city, in the county of New York and State of New York, have invented certain new and useful Improvements in Processes of Scouring Wool, of which the following is a specification.

This invention relates to processes of scouring wool; and it comprises a process of scouring wool wherein such scouring is effected with the aid of a solution containing potassium alginate; all as more fully hereinafter set forth and as claimed.

In the scouring of raw wool it is customary to use water containing various soaps and compositions. Many such compositions have been recommended for this purpose and a number are in use. I have discovered that I can effect a better scouring with a cleaner product by using in connection with the scouring solutions more or less potassium alginate. The potassium alginate may be used alone as a suitable solution, or it may be dissolved in any of the ordinary scouring baths. As to the reason for the improvement in scouring effected by the use of potassium alginate I am unable to say and content myself with noting the result.

Alginic acid is a complex body of unknown constitution occurring in various seaweeds of the nature of kelp. It is a gummy or amorphous material of acid nature and is wholly insoluble in water in the free state but is taken into solution by caustic soda or caustic potash to form extraordinarily viscous or gummy solutions. The compounds formed with soda or with potash is called an alginate. Alginic acid may be made from seaweed by extracting the weed with caustic soda, and precipitating the resultant solution with any convenient acid, such as sulfuric acid.

In practical embodiments of my invention I find it best to scour in a more or less methodical way with the use of several successive baths; these baths being used on the countercurrent principle. Ordinarily I use more or less soap in connection with the potassium alginate. Its use is not absolutely necessary but I secure better results. Any convenient commercial soap used for scouring wool may be used in connection with the alginate. I secure still more advantageous results however by making the soap at the same time that I make the potassium alginate solution. A desirable composition for the present purposes may be made by dissolving 4 parts of ordinary commercial caustic potash in 8 parts by weight of water and stirring thereinto 1 part of dry commercial alginic acid in powder form and 3 ounces of any suitable fat, such as tallow or oil such as cottonseed oil. Heat may be used to facilitate reaction. The result is a thick liquid or soupy mass. This composition is used in solution or in admixture with water. Ordinarily I pass the wool successively through 4 vats or containers. More or fewer may be used but 4 is a convenient number. In the first vat I may place a solution of the composition just described in the proportions of about 1 pound to, say, 12 gallons of water. This vat I maintain at about 120° F. and scour the raw wool therein. After successive lots of wool have been scoured in this vat and the solution becomes exhausted, the liquid may be treated for separating potash salts, lanolin, greases, etc. The residual liquid may be treated to recover alginic acid, potash, etc. In order to recover alginic acid, it may be simply acidulated with sulfuric acid whereupon alginic acid separates as an insoluble body. The partially scoured wool is now scoured in the second vat in succession in which I use a somewhat weaker solution of the stated composition. This bath may be made by dissolving a pound of the composition in 16 gallons of water. The temperature in this second scouring is best kept around 115° F. In the third scouring I use a still weaker solution, say, 1 pound of composition to 32 gallons of water. The temperature is also maintained at a somewhat less degree, say 110° F. In the fourth vat, I customarily use water for rinsing. When the second bath has been used for a time I customarily strengthen it by the addition of a little potassium alginate and use it for the first bath in the series. In the same way the third bath after a period of use, may be strengthened and used for the second bath. The water in the fourth vat after being used for rinsing for a time may be employed in making up the bath for the third vat.

What I claim is:—

1. In the scouring of wool the process which comprises treating such wool in a bath containing dissolved potassium alginate.

2. In the scouring of wool the process which comprises dissolving alginic acid and fat in a solution of caustic potash, diluting with water and scouring wool in a bath so formed.

In testimony whereof, I have hereunto affixed my signature.

THOMAS D. SMITH.